US 6,590,563 B1

(12) United States Patent
Oross et al.

(10) Patent No.: US 6,590,563 B1
(45) Date of Patent: Jul. 8, 2003

(54) POINTING DEVICE HAVING TWO PARTS AND METHOD OF USE THEREFOR

(75) Inventors: Glen A. Oross, Corvallis, OR (US); Robert P. Bliven, Corvallis, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 09/620,948

(22) Filed: Jul. 21, 2000

(51) Int. Cl.[7] .................................................. G09G 5/08
(52) U.S. Cl. ...................................... 345/163; 345/157
(58) Field of Search ............................... 345/156–173; 341/20–22; 361/683, 686

(56) References Cited

U.S. PATENT DOCUMENTS

| 4,906,843 A | * | 3/1990 | Jones et al. ................. 250/221 |
| 5,428,355 A | * | 6/1995 | Jondrow et al. .............. 341/20 |
| 5,828,364 A |   | 10/1998 | Siddiqui ..................... 345/163 |
| 5,861,873 A | * | 1/1999 | Kikinis ........................ 345/157 |
| 5,963,197 A |   | 10/1999 | Bacon et al. ................. 345/163 |
| 6,193,196 B1 | * | 2/2001 | Hesley ....................... 248/118.1 |
| 6,323,841 B1 | * | 11/2001 | Lai ............................... 345/163 |
| 6,369,798 B1 | * | 4/2002 | Yatsu et al. .................. 345/167 |
| 6,392,634 B1 | * | 5/2002 | Bowers et al. ............... 345/163 |
| 6,476,795 B1 | * | 11/2002 | Derocher et al. ............ 345/163 |

FOREIGN PATENT DOCUMENTS

JP            11-232029         * 8/1999

* cited by examiner

*Primary Examiner*—Steven Saras
*Assistant Examiner*—Amr Awad

(57) ABSTRACT

This invention describes an electronic device having a pointing device consisting of a first portion and a second portion. The second portion of the pointing device is separable from the first and is configured to be stored in an opening formed in the electronic device. The opening formed in the electronic device is configured to receive the second portion of the pointing device once the second portion of the pointing device is separated from the first. Additionally, a method for configuring the pointing device and storing the second portion of the pointing device inside of the electronic device is described.

24 Claims, 9 Drawing Sheets

POINTING DEVICE HAVING TWO PARTS AND METHOD OF USE THEREFOR

FIELD OF THE INVENTION

This invention relates to an input device and more particularly to a mouse for an electronic device.

The first computers were introduced to the work place, in substantial numbers, in the early 1980's. Since then, the development and popularity of computers in the work place, especially desktop and laptop computers, have grown tremendously. Along side the development of these computers has been the development of pointing devices. One such pointing device is the computer mouse.

A computer mouse is a small hand held interactive input device that, when rolled over a flat surface, controls placement of a cursor displayed on a terminal attached to the computer. The mouse is typically attached to the computer by a wire, although in some modern designs, the mouse and computer are wirelessly coupled. The mouse is typically equipped with one or more control buttons. The buttons allow the user to interact with the computer by choosing various options, which typically appear in the form of icons displayed on the computer terminal. The mouse typically consists of a case which has a flat bottom containing a directional sensor for detecting movement of the mouse.

Various types of directional sensors for detecting movement of the mouse are commercially available including mechanical and optical sensors. A mouse containing a mechanical directional sensor (mechanical configuration) typically contains a rubber-coated ball on the underside of the case. As the mouse is moved, the ball contacts an electrical-mechanical sensor which detect the motion of the ball and converts this movement into electrical signals which are communicated to the computer. The mechanical configuration can be used on virtually any surface, although a smooth surface gives better results.

In contrast, a mouse containing an optical directional sensor works by registering the position of the mouse by emitting light onto the surface upon which the mouse rests. The light is reflected from the surface and captured by an optical sensor typically disposed adjacent to the light source. Movement of the mouse is electrically extracted from variation in the transmitted and reflected light and is communicated to the computer. Typically a special reflective mouse pad is used to reflect light more efficiently from the surface upon which the mouse rests, although in some modern designs a reflective mouse pad is not required.

A mouse is generally configured to be interfaced with both desktop and laptop computers. Laptop computers ("Laptop"), however, typically have a pointing device designed into an upper surface of the computer. Designs as such make the laptop more portable and allows operation of the computer in confined spaces. However, many operators of laptop computers enjoy the flexibility and comfort of using a "regular" mouse instead of the built-in pointing device ("laptop mouse") because some users find a laptop mouse cumbersome to use and lacking in ergonomic design. To address this concern, some laptop computer manufactures have developed a miniature mouse that is affixed to a side of the laptop. This design, however, still limits the freedom the user has to move the mouse because the mouse is mechanically attached to the laptop. In this regard, there still remains a need for a mouse that can be used in conjunction with an electronic device such as a laptop computer that may be easily stowed, transported, and does not restrict the degree of freedom the operator has to move the mouse.

BRIEF DESCRIPTION OF THE DRAWINGS

FIG. 4b is a front view of the second mouse portion shown in FIG. 4a.

SUMMARY OF THE INVENTION

An aspect of the invention describes an electronic device having a pointing device consisting of a first portion and a second portion. The second portion is separable from the first portion of the pointing device and is configured to be stored in an opening formed in the electronic device. The opening formed in the electronic device is configured to receive the second portion of the pointing device when the second portion of the pointing device is separated from the first portion. The opening of the electronic device preferably has rails formed therein for guiding the second portion into the opening.

DETAILED DESCRIPTION OF THE PREFERRED EMBODIMENT

Figure 1:
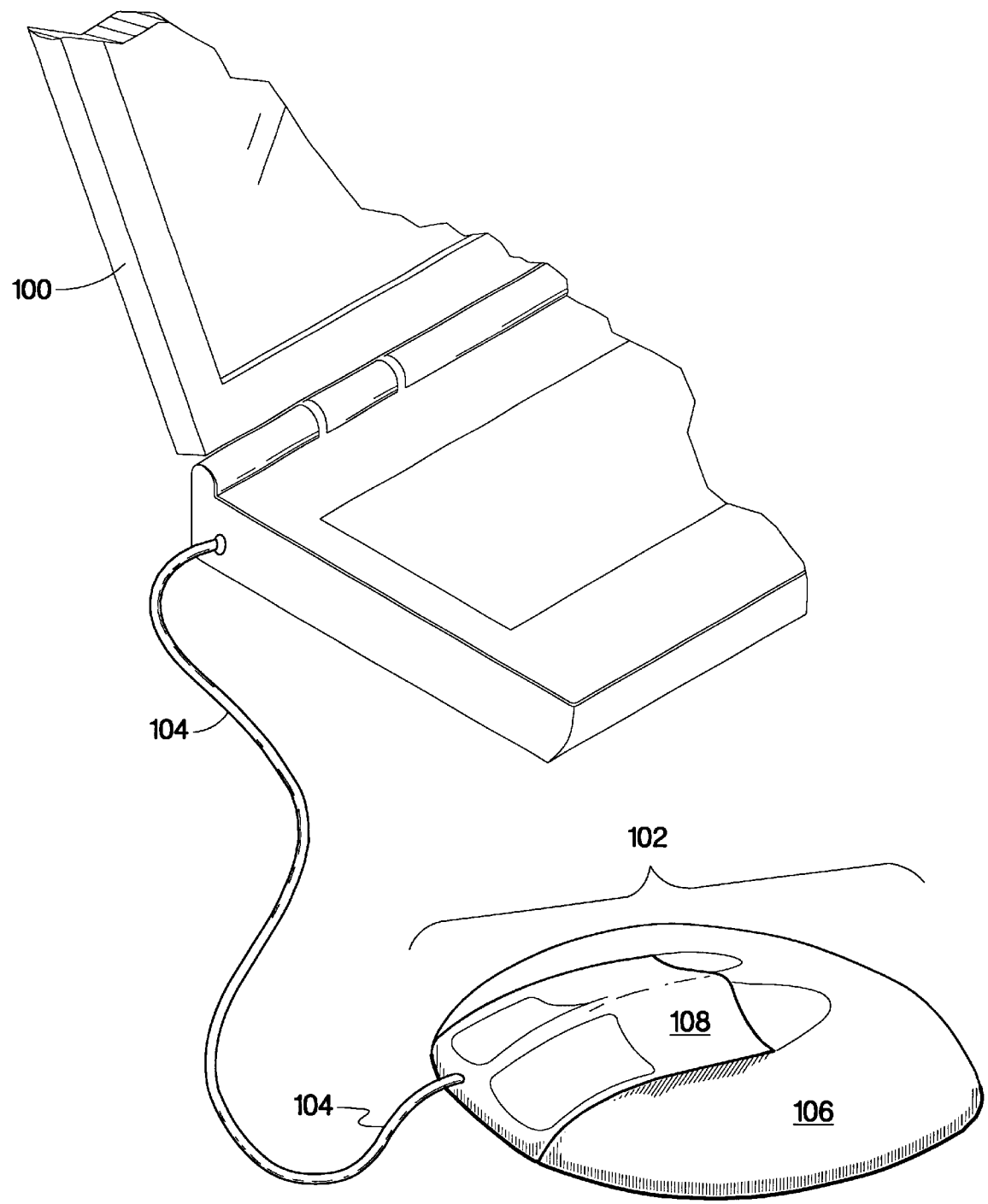
FIG. 1 is a partial perspective of view of an electronic device, specifically a laptop computer, electrically coupled to a mouse.

FIG. 1 is a perspective view of a mouse 102 electrically coupled to a laptop computer (laptop) 100. Although a laptop 100 is shown in FIG. 1, various electronic devices may be coupled to mouse 102 such as web appliances, palm computers and video games. In a preferred embodiment of the present invention, mouse 102 consists of two parts referred to as a first mouse portion 106 and a second mouse portion 108.

Figure 2A:
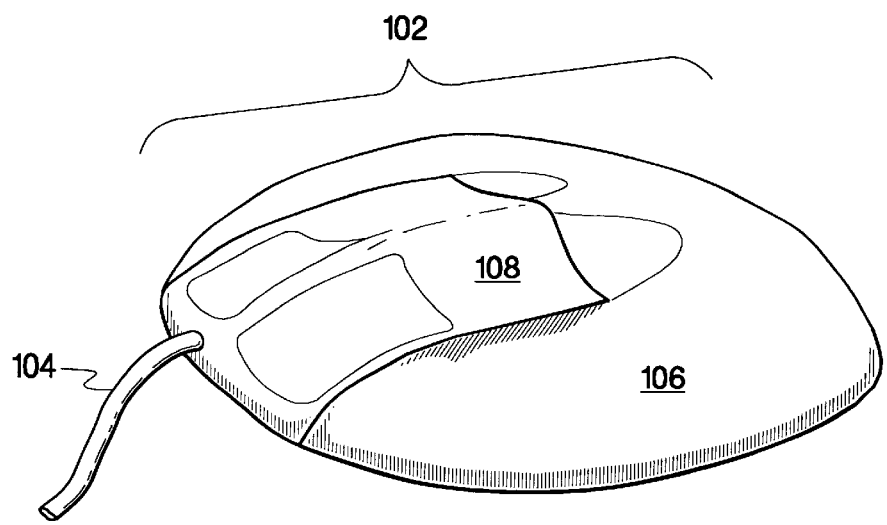
FIG. 2a is a perspective view of the mouse shown in FIG. 1. Here, a first mouse portion and a second mouse portion is revealed.

FIG. 2a is an enlarged perspective view of mouse 102 shown in FIG. 1. Here, the second mouse portion 108 functions as a translational device for controlling the positioning of a cursor displayed on the laptop's monitor. The first mouse portion 106 is electrically dependent on the second mouse portion 108 whereas the first mouse portion 106 functions electrically independent of the second mouse portion 108. The first mouse portion 108 functions preferably as an ergonomically designed hand rest or, alternatively, an auxiliary device such as a keypad, scanner, digital camera, video recorder, telephone, power supply or calculator.

Figure 2B:
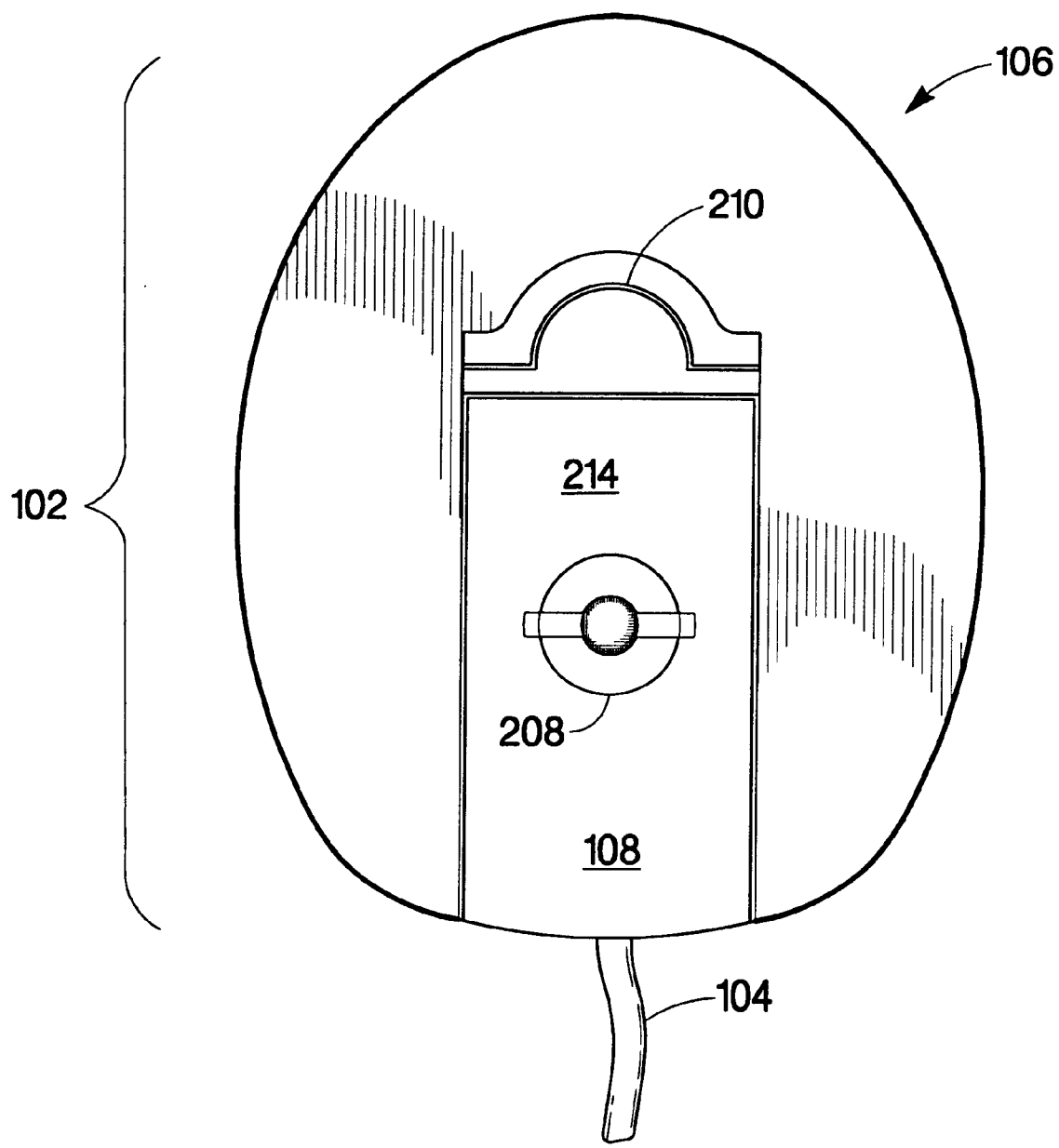
FIG. 2b is a bottom view of the mouse shown in FIG. 2a revealing the interface between the first mouse portion and the second mouse portion and a lever used to disconnect the first mouse portion from the second mouse portion.

FIG. 2b shows a bottom view of mouse 102 shown in FIG. 2a. In this figure, first mouse portion 106 and second mouse portion 108 are connected. The second mouse portion 108 has a bottom surface 214 containing a sensor 208 used to detect movement of mouse 102. The sensor converts the movement of mouse 102 into electrical signals, which are communicated to the laptop. The first mouse portion 106 contains a lever 210 that releases second mouse portion 108 from first mouse portion 106 when the lever 210 is pulled.

Figure 3:
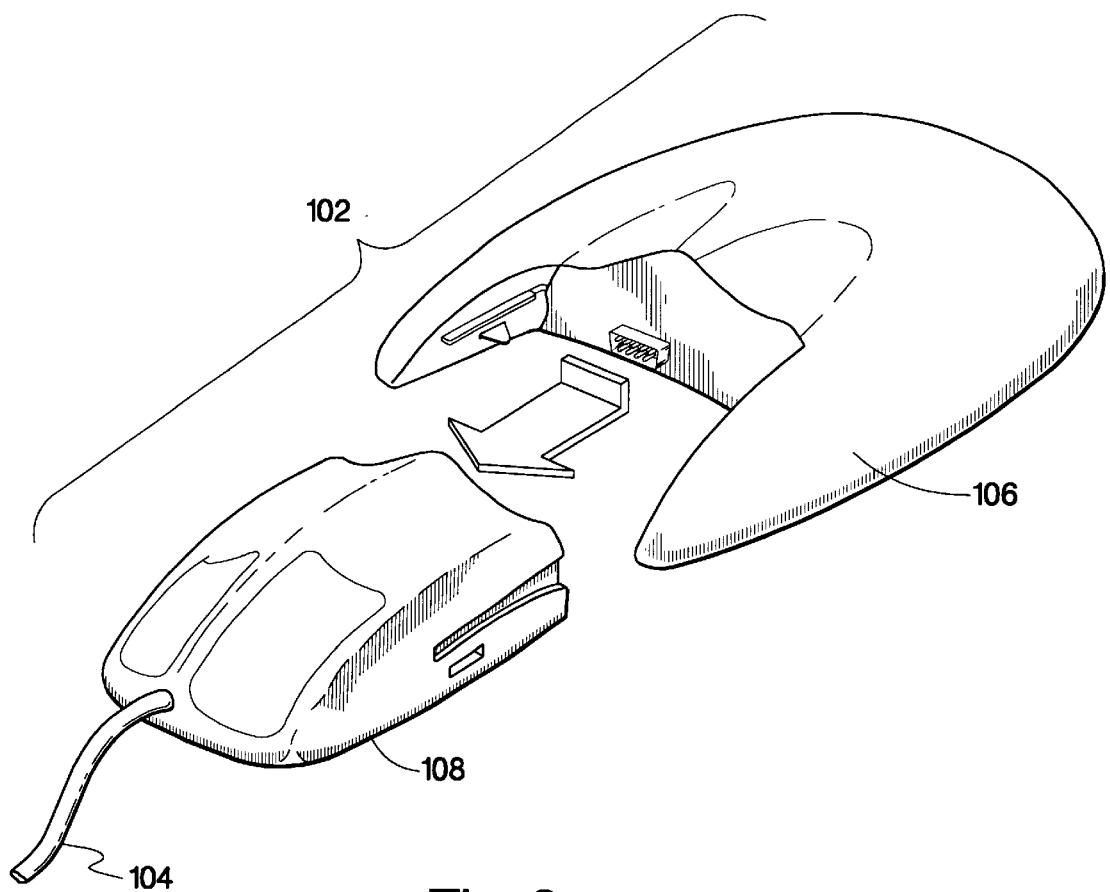
FIG. 3 is an enlarged perspective view of the mouse shown in FIG. 2a where the first mouse portion has been separated from the second mouse portion.

FIG. 3 shows a perspective view of mouse 102 previously described in FIG. 2a and FIG. 2b. Here, the first mouse portion 106 has been separated from the second mouse portion 108. Once mouse 102 is separated, the second mouse portion 108, which is substantially smaller than the first mouse portion 106, can still be used to control the laptop's cursor. The smaller size of the second mouse portion 108 makes for easy storage of the second mouse portion 108 within laptop 100.

Figure 4A:
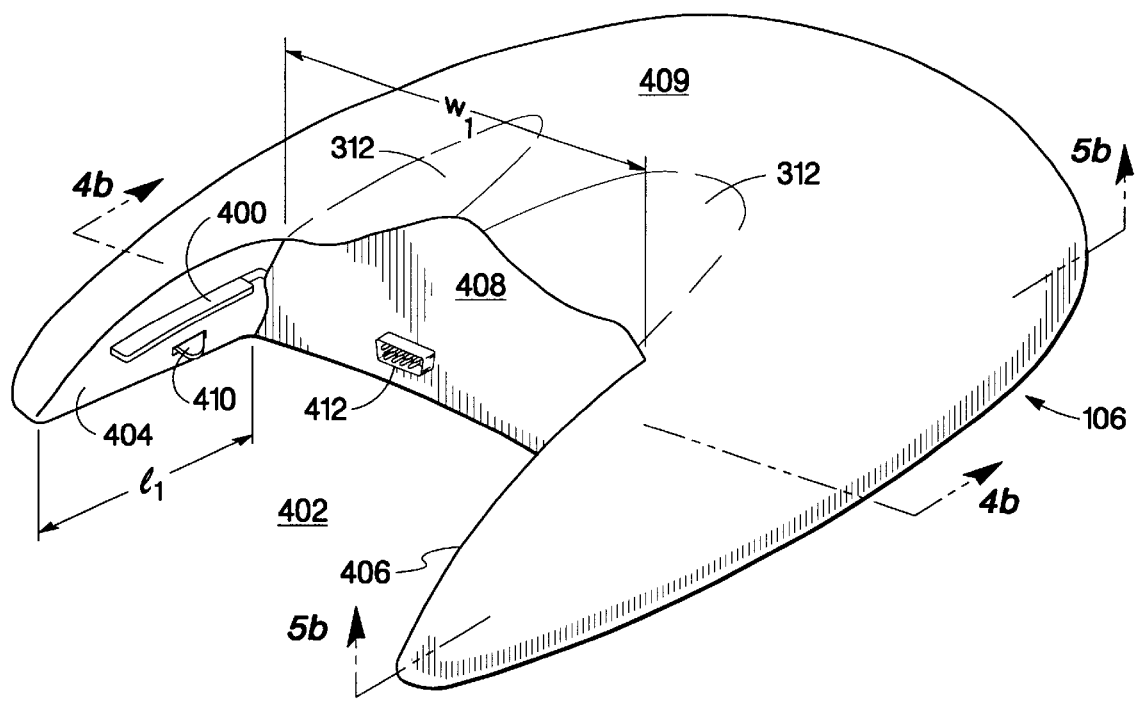
FIG. 4a is a close-up perspective view of the first mouse portion shown in FIG. 3 revealing rails for receiving the second mouse portion, fasteners for latching the second mouse portion and an electrical interconnect for electrically coupling the first mouse portion to the second mouse portion.

FIG. 4a shows an enlarged perspective view of first mouse portion 106 separated from second mouse portion 108. In this figure, the first mouse portion 106 has an upper surface 409 and a slot 402 into which the second mouse portion 108 is inserted. The slot 402 has three lateral sidewalls as indicated by reference numbers 404, 406, and 408 respectively. Sidewalls 404 and 406 are substantially parallel and are separated by width "w". Sidewalls 406 and 404 are orthogonal to sidewall 408 and extend a distance "$l_1$" from sidewall 408. Additionally, sidewalls 404 and 406 contain rails 400 that are used to guide the second mouse portion 108 into slot 402.

Lateral sidewalls 404 and 406 also contain fasteners 410, which are mechanically coupled to lever 210 (see FIG. 2b) that extends from sidewalls 404 and 406 inward towards slot 402. The lever 210 has a fastener 410 attached thereto which firmly holds the second mouse portion 108 against side wall 408 once second mouse portion 108 is inserted. The fastener 410 extends from sidewalls 404 and 406 a distance approximately equal to distance $d_1$ of rails 400 (See FIG. 4a). The first mouse portion 106 shown in FIG. 4a has indentions 312 formed in upper surface 409. The indentions 312 are positioned on the upper surface 409 such that the first mouse portion 106 will fit the natural curvature of the operator's hand and fingers.

Sidewall 408 shown in FIG. 4a contains a communications port 412. The communications port 412 aligns with a complementary communications port located on the second mouse portion 108 such that when second mouse portion 108 is inserted into first mouse portion 106, a continuous electrical path is formed. The communications port 412 allows the first mouse portion 106 and the second mouse portion 108 to communicate. In a preferred embodiment, the communications port 412 and communications link 104 are preferably coupled to a universal serial bus (USB). However, other standard communication interfaces such as an RS-232 or FireWire (IEEE 1394) may be used and still fall with the scope of the present invention.

Figure 4B:
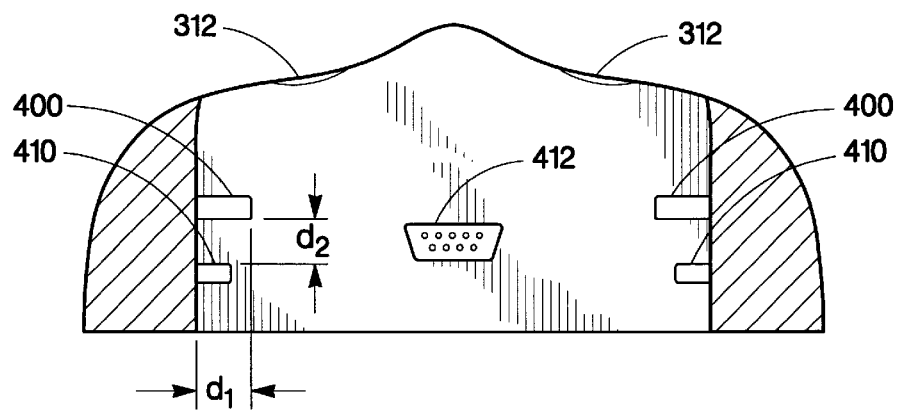

The communications port 412 is also shown in FIG. 4b, which is a cross section of FIG. 4a. Here, both rails 400 are visible as well as fasteners 410. From this view, the ergonomic design incorporating indentions 312 of upper surface 409 is also more visible. Additionally, Fig.4b illustrates the positioning of rails 400. The rails 400 extend approximately length $l_1$ of lateral sidewalls 404 and 406 and protrude a distance "$d_1$" from lateral sidewalls 404 and 406 as shown in FIG. 4b. The rails 400 are separated from fasteners 410 by distance "$d_2$". This distance is sufficient to allow second mouse portion 108 to be easily inserted into the first mouse portion 106.

Figure 5B:
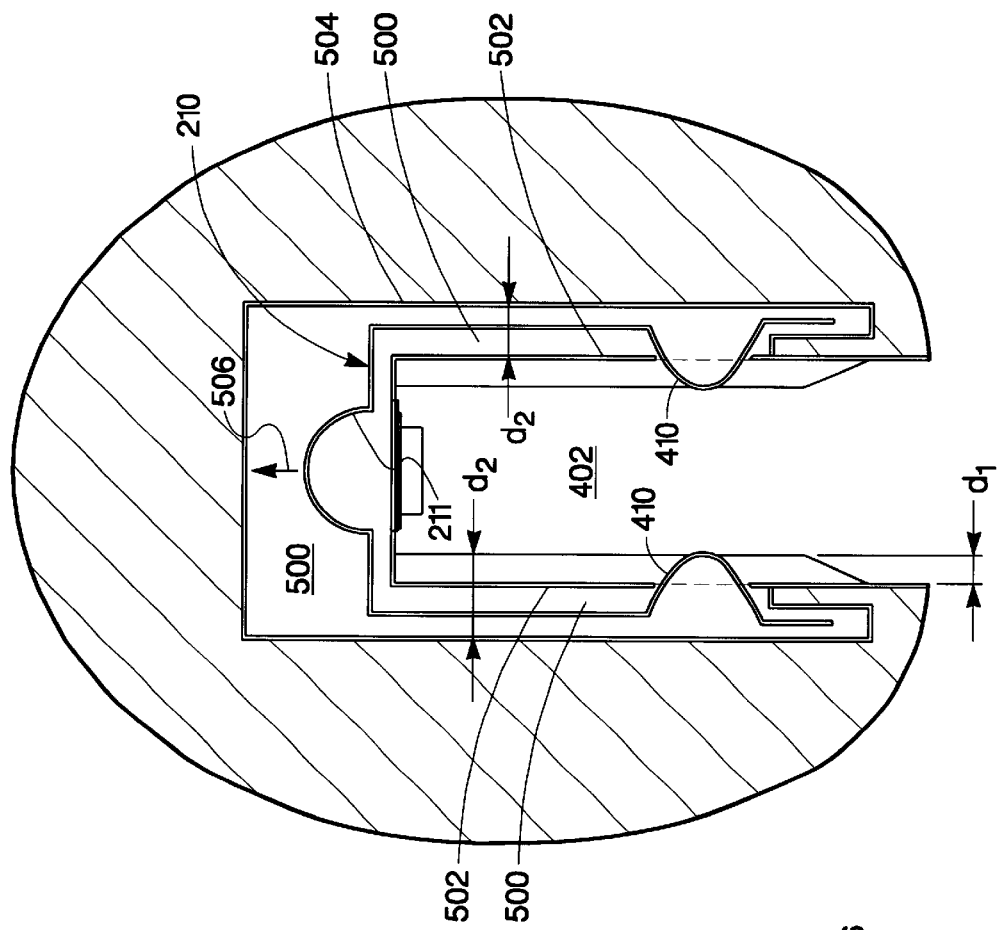
FIG. 5b is a bottom cross sectional view of the first mouse portion shown in FIG. 5a revealing a groove in which the lever is disposed.
Figure 5A:
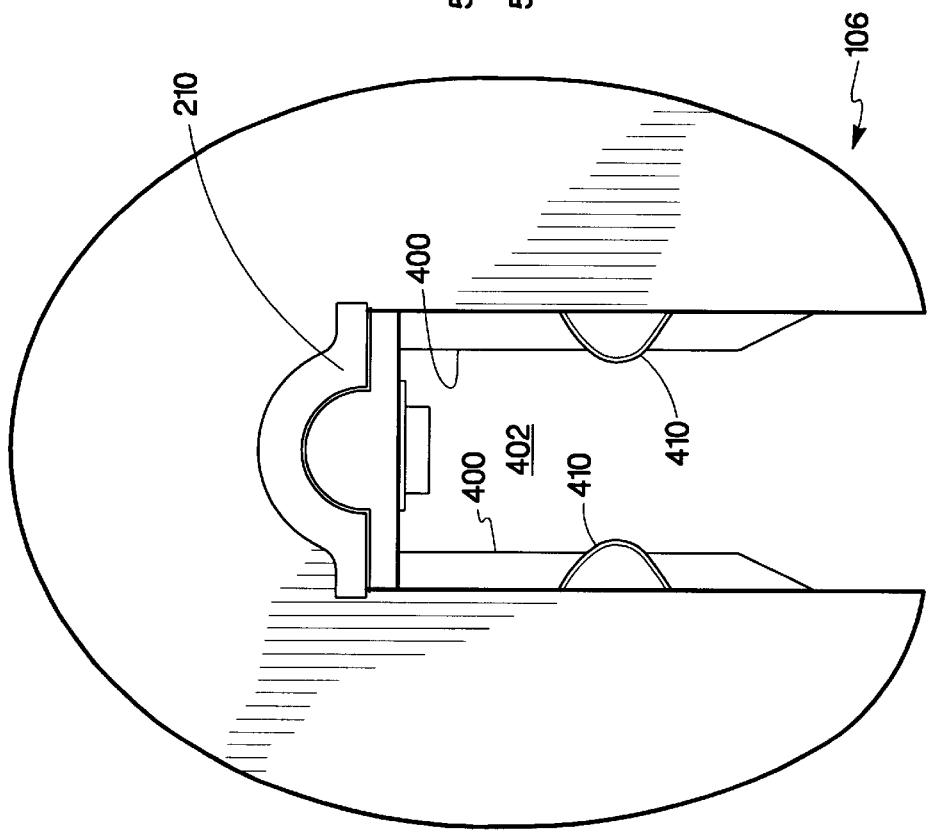
FIG. 5a is a bottom view of the second mouse portion shown in FIG. 4a. wherein both rails and fastener are clearly shown.

FIG. 5a shows a bottom view of first mouse portion 106 shown in FIG. 4a. In this figure, fasteners 410, rails 400 and lever 210 are visible. FIG. 5b shows a cross-sectional view of first mouse portion 106 along the 5b perspective previously shown in FIG. 4a. In this figure, the bottom surface 214 has been removed revealing lever 210 configured therein. The first mouse portion 106 contains, beneath bottom surface 214, a groove 500 having inner walls 502 and outer walls 504 in which lever 210 is placed. In a preferred embodiment, lever 210 is made of wire although rigid plastic will work as well. The depth of groove 500 is greater than the thickness of the lever 210, and the width of the groove is much greater than the width of lever 210. Consequently, lever 210 freely moves within groove 500. When the lever handle 211 is pulled forward as indicated by reference number 506 in FIG. 5b, the fasteners 410 are force away from slot 402 by inner walls 502. Once the fasteners 410 are recessed into the inner wall 502, the second mouse portion 108 is released.

Figure 6A:
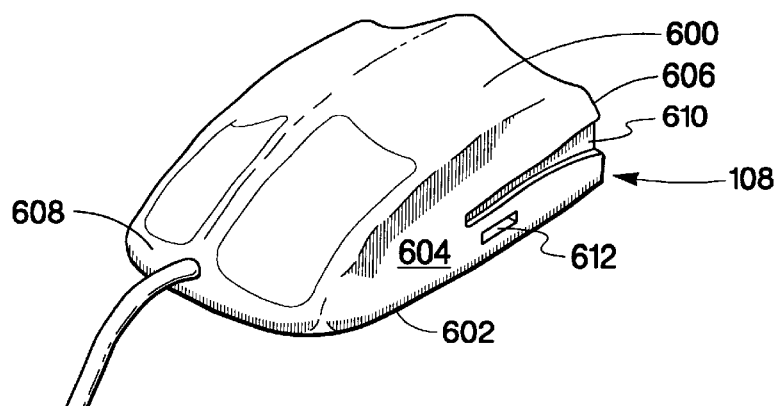
FIG. 6a is a perspective view of the second mouse portion shown in FIG. 3 were grooves configured to receive the rails of the first mouse portion are revealed along side latch indentions to which fasteners attach.

FIG. 6a shows a perspective view of the second mouse portion 108 shown in FIG. 3. The second mouse portion 108 contains an upper surface 600, bottom surface 602, outer side walls 604, a front end 606 and rear end 608. A groove 610 is formed on outer sidewalls 604. The groove 610 is configured to receive rails 400 of the first mouse portion 106 (See FIG. 4a). A latched indention 612 is formed on sidewall 604 below groove 610. The latch indention 612 is configured to receive fastener 410 shown in FIG. 4a. Upon sliding the second mouse portion 108 into the first mouse portion 106, fastener 410 (see FIG. 5a) snaps into latch indention 612.

Figure 6B:
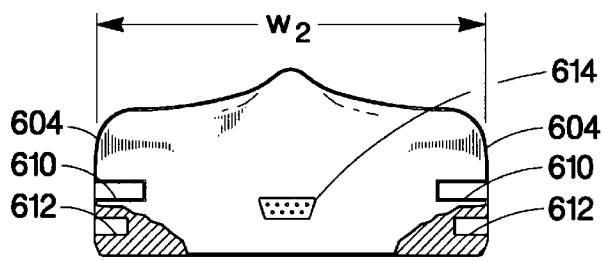
FIG. 6b is a front view of the second mouse portion shown in FIG. 6a revealing symmetrical grooves formed on each side of the second mouse portion and a second interconnect which attaches to the first interconnect of the first mouse portion.

FIG. 6b shows a planar view of second mouse portion 108 shown in FIG. 6a. Here, front end 606 of second mouse portion 108 contains a second interconnect 614 which receives first interconnect 412 shown in FIG. 4b. In a preferred embodiment, interconnect 614 is a female connector type and the corresponding connector 412 in FIG. 4b is a male connector type. A proper electrical connection is established between first mouse portion 106 and second mouse portion 108 when second mouse portion 108 is inserted into the first mouse portion 106 to the point where a snapping sound is heard. The snapping sound represents engagement of latch 412 and latch indention 612. FIG. 6b further reveals groove 610 and latch indention 612 symmetrically formed on both sides of second mouse portion 108.

Figures 6C, 6D:
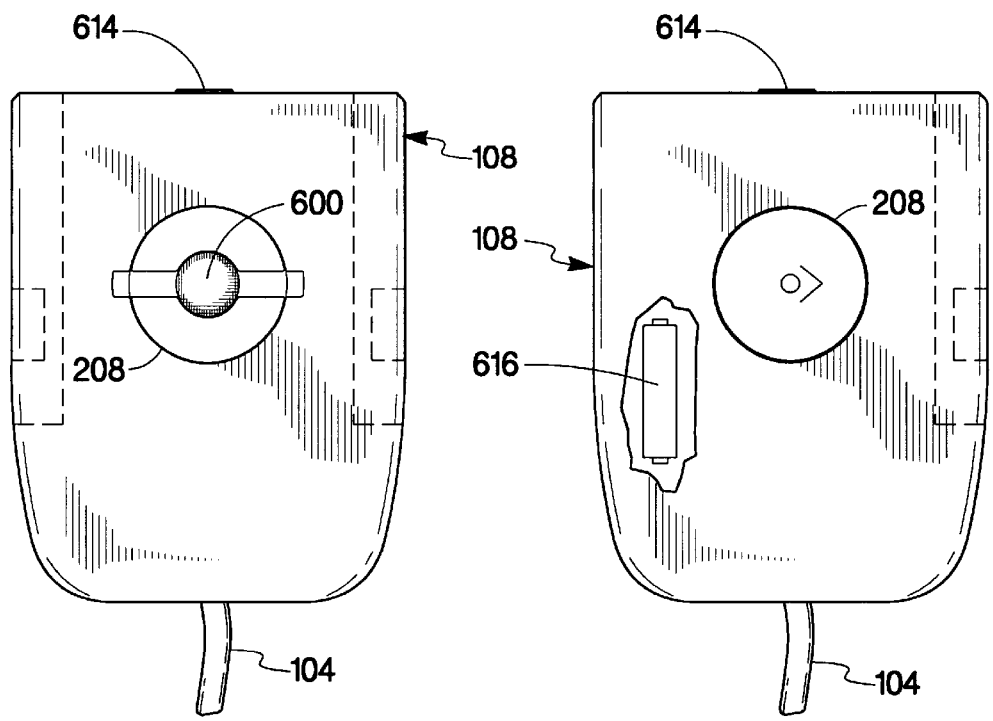
FIG. 6c is a bottom view of the second mouse portion shown in FIG. 6a revealing a mechanical directional sensor.
FIG. 6d is a bottom view of the second mouse portion shown in FIG. 6c revealing an optical directional sensor.

FIG. 6c is a bottom view of second mouse portion 108 shown in FIG. 6a. Here, the sensor 208 consists of a ball 600 which, upon movement of the second mouse portion 108, engages circuitry disposed in the second mouse portion 108. The circuitry converts mechanical movement of the ball 600 to electrical signals that are communicated to the electronic device through communications link 104. In one embodiment of the present invention, electrical signals are bilaterally transmitted to the electronic device via wireless communication. Likewise, the laptop communicates wirelessly with the second mouse portion.

FIG. 6d is a bottom view of another embodiment of second mouse portion 108 shown in FIG. 6a. In this embodiment, the sensor 208 is an optical device which monitors movement of the second mouse portion 108. The optical device contains a photo diode system that receives repeated images of the surface on which the mouse rests and extracts from those images movement of second mouse portion 108. The extracted data is communicated to the laptop 100 wirelessly or via communications link 104. In one embodiment, a rechargeable battery 616, used to power electronics enclosed within second mouse portion 108, is provided.

Figure 7:
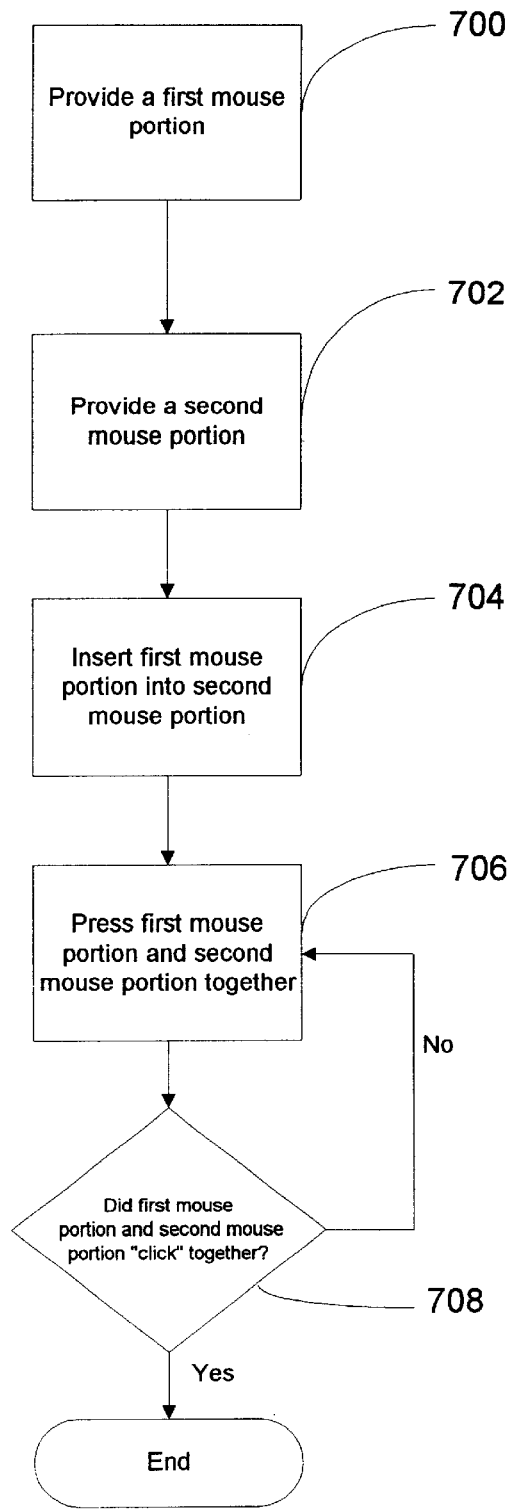
FIG. 7 is a flow chart describing the steps required to configure the mouse.

FIG. 7 is a process diagram providing steps for configuring mouse 102. First, a first mouse portion is provided as illustrated by reference number 700 in FIG. 7. Next, a second mouse portion is provided 702. The first mouse portion is then inserted into the second mouse portion 704. The first mouse portion and second mouse portion are pressed firmly together 706 until a clicking sound is heard 708. The clicking sound indicates that the first mouse portion has properly engaged the second mouse portion.

Figure 8:
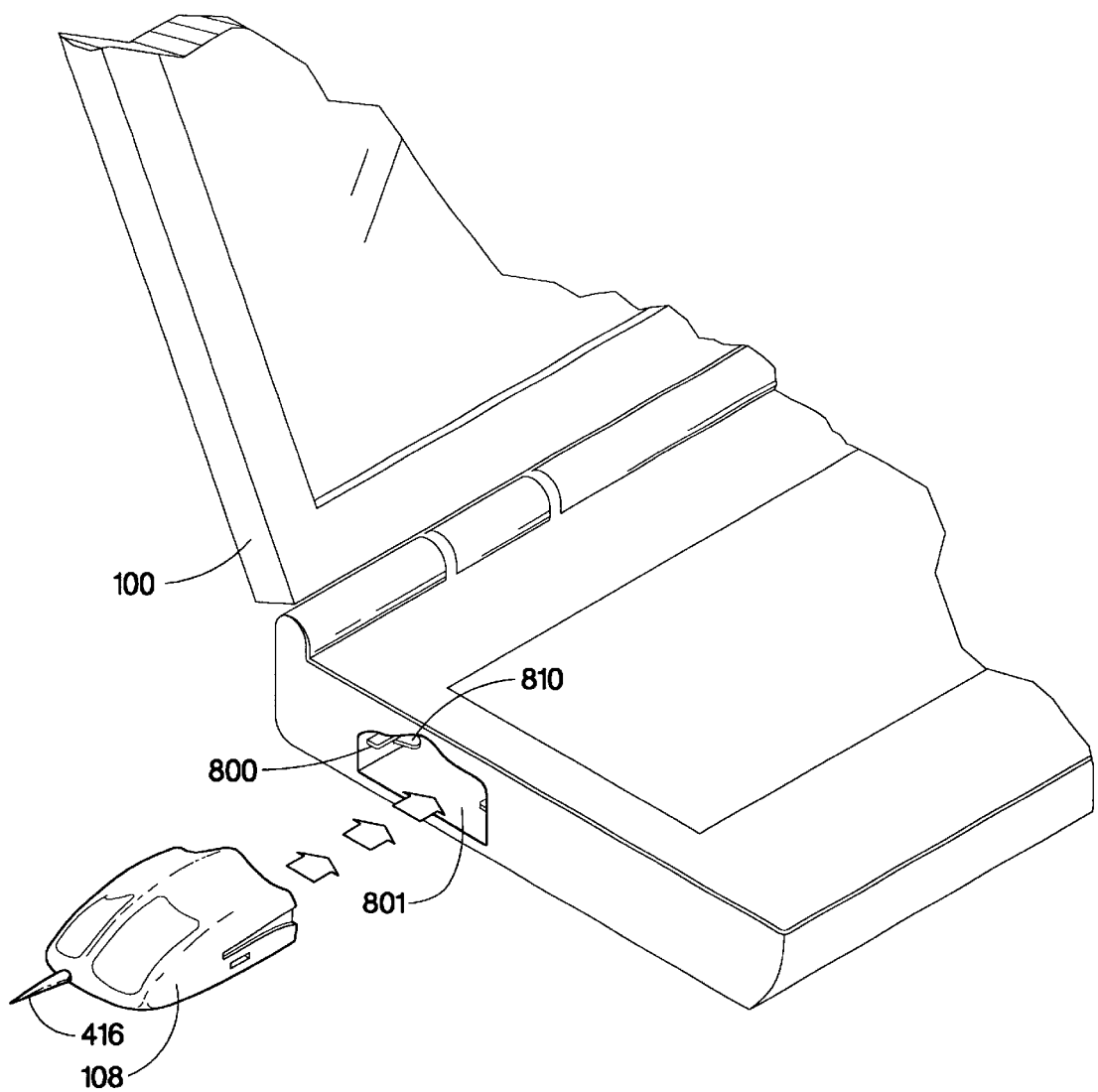
FIG. 8 is a perspective view of an embodiment of the present invention wherein a wireless second mouse portion is inserted into a laptop computer that is configured to receive the second mouse portion.

FIG. 8 shows a preferred embodiment of the present invention where the laptop 100 has an opening 801 for receiving second mouse portion 108. The opening 801 contains storage rails 800 and a latch 810 analogous to the rails 400 and latch 410 shown in FIG. 4a. The opening 801 is configured similarly to slot 402. For example, opening 801 contains a male connector type interconnect configured to receive the female connector type interconnect 614 when second mouse portion 108 is inserted. Additionally, the rechargeable battery 616 contained within an embodiment of second mouse portion 108 is rechargeable upon inserting second mouse portion 108 into laptop 100.

Figure 9:
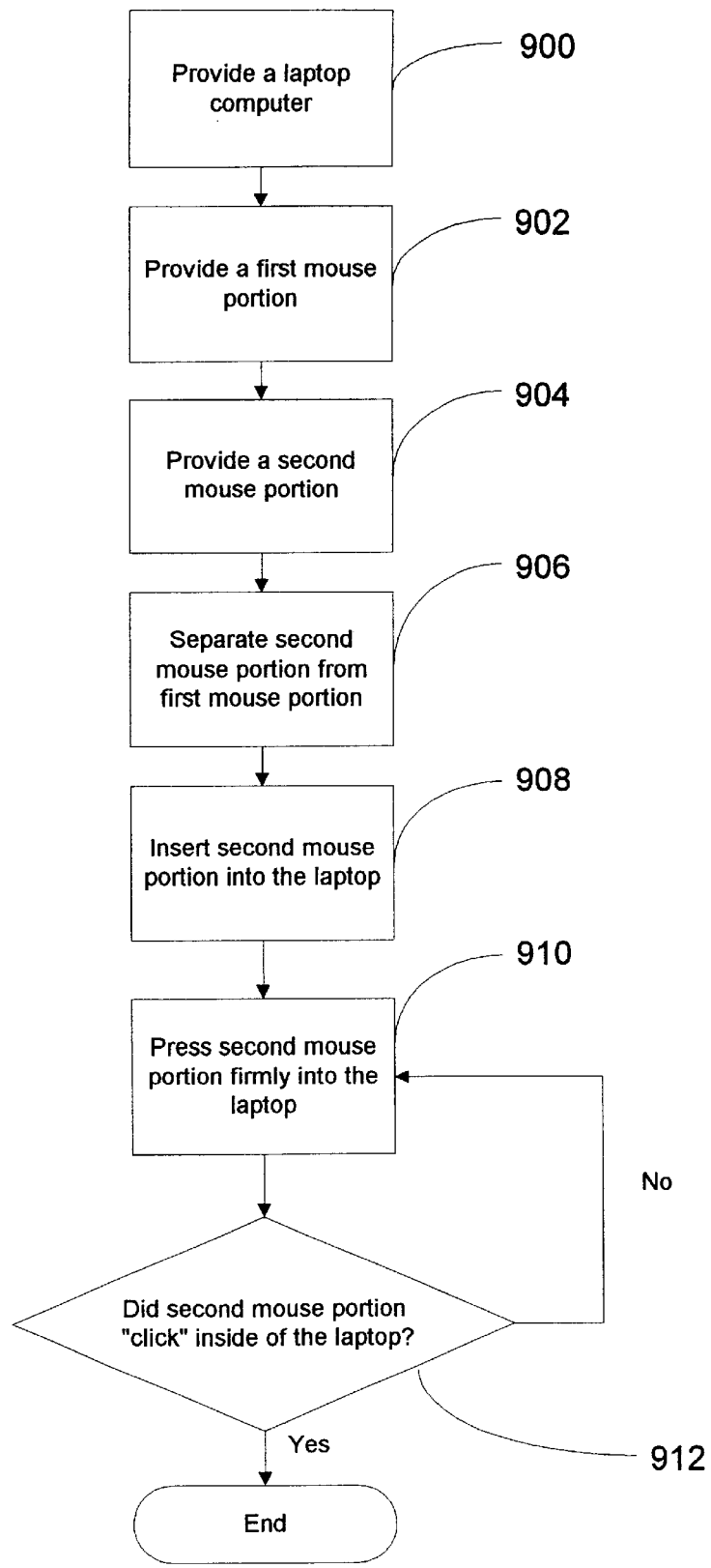
FIG. 9 is a process diagram describing a method for storing the second mouse portion in the laptop.

FIG. 9 shows a process diagram describing a method for storing the second mouse portion in laptop 100. This process begins by providing a laptop as indicated by reference number 900. Next, a first mouse portion is provided 902 followed by a second mouse portion 904. The second mouse portion and first mouse portion are separated 906. The second mouse portion is then inserted into opening 801 of laptop 100 shown in FIG. 8 by aligning storage rails 800 with groove 610. This step is indicated by reference number 908 in FIG. 9. The second mouse portion is pressed firmly into opening 801 until a clicking sound is heard 910. The clicking sound indicates that the second mouse portion has properly engaged 912 the communications port located within opening 801. With the communications port properly engaged, battery 616 is recharged.

What is claimed is:

1. An electronic device, comprising:
   a pointing device having a first portion and a second portion, the first and second portions of the pointing device being configured to move together translationally to control the position of a cursor on an associated display, wherein the second portion includes a communications port for communicating with the first portion; and
   an opening configured to receive the second portion of the pointing device when the second portion is separated from the first portion.

2. The electronic device of claim 1 wherein the opening configured to receive the second portion includes rails for guiding the second portion into the opening.

3. The electronic device of claim 1 wherein the second portion includes a rechargeable battery.

4. The electronic device of claim 3 wherein the opening contains circuitry for recharging the battery contained in the second portion.

5. The electronic device of claim 1 wherein the second portion electronically communicates with the electronic device substantially independently of the first portion.

6. The electronic device of claim 1 further comprising a communications port configured for wireless communication with at least the second portion.

7. The electronic device of claim 1, further comprising a monitor having a cursor wherein the second portion of the pointing device is a translation device for substantially controlling the positioning of the cursor on the monitor of the electronic device.

8. A pointing device for an electronic device, comprising:
   a first portion; and
   a second portion, the first portion including a slot wherein the second portion is received, the second portion is separable from the first portion and is configured for storage in the electronic device; wherein,
   the first and second portions are configured to move together translationally to control the position of a cursor on a display associated with the electronic device, wherein the second portion includes a communications port for communicating with the first portion.

9. The pointing device of claim 8 wherein the first portion includes rails positioned inside of the slot for guiding the second portion into the first portion.

10. The pointing device of claim 8 wherein the second portion communicates with the electronic device substantially independent of the first portion.

11. The pointing device of claim 8 wherein the first portion is configured as a hand rest, the first portion being exchangeable with another first portion configured to achieve a function selected from the group consisting of: a keypad, a scanner, a digital camera, a video recorder, a telephone, a power supply, and a calculator.

12. The pointing device of claim 11 wherein the first portion is a scanner.

13. The pointing device of claim 11 wherein the first portion is a hand rest.

14. The pointing device of claim 8 wherein the second portion bilaterally communicates wirelessly with the electronic device.

15. The pointing device of 8 wherein the second portion includes a communications port for communicating with the first portion.

16. The pointing device of claim 8 wherein the second portion includes a rechargeable battery.

17. A method of configuring a pointing device comprising, the steps of:
   providing a first portion;
   providing a second portion;
   inserting the first portion into the second portion, wherein, the first and second portions are configured to move together translationally to control the position of a cursor on an associated display, and wherein the second portion includes a communications port for communicating with the first portion; and pressing the first portion into the second portion until a clicking sound occurs.

18. The method of claim 17 further comprising the step of positioning the second portion on rails for guiding the first portion into the second portion.

19. The method of claim 18 further comprising the step of pressing a lever to release the first portion from the second portion.

20. The method of claim 18 further comprising the step of exchanging the first portion with another first portion configured to achieve a function selected from the group consisting of a keypad, a scanner, a digital camera, a video recorder, a telephone, a power supply, and a calculator.

21. A method of storing a pointing device comprising the steps of:

providing an electronic device having an opening;

providing a pointing device having a first portion and a second portion;

separating the first portion from the second portion wherein, the first and second portions are configured to move together translationally to control the position of a cursor on a display associated with the electronic device, wherein the second portion includes a communications port for communicating with the first portion; and inserting the second portion into the opening of the electronic device.

22. The method of claim 21 further comprising the step of coupling the second portion to communications circuitry formed inside of the electronic device by firmly inserting the second portion into the electronic device until a clicking sound occurs.

23. The method of claim 21 further comprising the step of charging a battery contained within the second portion.

24. The method of claim 21 further comprising the step of removing the second portion from the electronic device and coupling the second portion to the first portion.

* * * * *